United States Patent
Newnham et al.

(10) Patent No.: US 11,909,020 B2
(45) Date of Patent: Feb. 20, 2024

(54) BATTERY PACKS WITH REDUCED WEIGHT AND IMPROVED THERMAL PERFORMANCE

(71) Applicant: Cummins Inc., Columbus, IN (US)

(72) Inventors: Ian A. Newnham, Milton Keynes (GB); Haroon Junaidi, Milton Keynes (GB)

(73) Assignee: Cummins Inc., Columbus, IN (US)

( * ) Notice: Subject to any disclaimer, the term of this patent is extended or adjusted under 35 U.S.C. 154(b) by 70 days.

(21) Appl. No.: 17/314,994

(22) Filed: May 7, 2021

(65) Prior Publication Data

US 2021/0376407 A1 Dec. 2, 2021

Related U.S. Application Data

(60) Provisional application No. 63/031,236, filed on May 28, 2020.

(51) Int. Cl.
*H01M 10/6554* (2014.01)
*H01M 10/613* (2014.01)
*H01M 10/653* (2014.01)
*H01M 50/233* (2021.01)
*H01M 50/227* (2021.01)

(52) U.S. Cl.
CPC ..... *H01M 10/6554* (2015.04); *H01M 10/613* (2015.04); *H01M 10/653* (2015.04); *H01M 50/227* (2021.01); *H01M 50/233* (2021.01)

(58) Field of Classification Search
CPC ........... H01M 10/6554; H01M 10/613; H01M 10/653; H01M 50/227; H01M 50/233; H01M 10/0481; H01M 10/633; H01M 10/6567; H01M 50/293; Y02E 60/10
See application file for complete search history.

(56) References Cited

U.S. PATENT DOCUMENTS

| | | | |
|---|---|---|---|
| 8,936,864 B2 | 1/2015 | Yang | |
| 9,054,361 B2 | 6/2015 | Christian | |
| 9,343,784 B2 | 5/2016 | Wayne | |
| 9,627,724 B2 | 4/2017 | Yum | |
| 10,355,330 B2 | 7/2019 | Raiser | |
| 10,361,469 B2 | 7/2019 | Kim | |
| 10,501,597 B2 | 12/2019 | O'Neil | |
| 2009/0142628 A1 | 6/2009 | Okada | |
| 2015/0255837 A1 | 9/2015 | Larsson | |
| 2018/0026296 A1 | 1/2018 | Kruger | |
| 2019/0280265 A1 | 9/2019 | Jansen | |
| 2021/0066768 A1* | 3/2021 | Gao | H01M 50/609 |

FOREIGN PATENT DOCUMENTS

| | | | | |
|---|---|---|---|---|
| CN | 108183279 A | * | 6/2018 | .......... H01M 10/613 |
| CN | 208489335 U | * | 2/2019 | |
| CN | 209217147 | * | 8/2019 | ........ H01M 10/4285 |
| CN | 210516845 U | * | 5/2020 | ............. Y02E 60/10 |
| WO | 2015113946 A1 | | 8/2015 | |
| WO | 2018220199 A1 | | 12/2018 | |

* cited by examiner

*Primary Examiner* — Kaity V Chandler
(74) *Attorney, Agent, or Firm* — Faegre Drinker Biddle & Reath LLP

(57) ABSTRACT

A support structure for a battery pack and a battery pack including the support structure and battery cells, the support structure including a base plate; a thermal plate positioned between the battery cell and the base plate; a thermally conductive material between the battery cell and the thermal plate; and a compressible support between the thermal plate and the base plate.

23 Claims, 13 Drawing Sheets

BATTERY PACKS WITH REDUCED WEIGHT AND IMPROVED THERMAL PERFORMANCE

CROSS-REFERENCE TO RELATED APPLICATIONS

This application claims the benefit of and priority from U.S. Provisional Patent Application No. 63/031,236, filed May 28, 2020, which is incorporated herein by reference in its entirety.

TECHNICAL FIELD

The disclosure relates to thermal control systems and methods of making and using battery packs.

BACKGROUND OF THE DISCLOSURE

Battery packs are manufactured by placing multiple battery modules in parallel in a frame. A thermal plate is positioned beneath the modules. The purpose of the thermal plate is to remove heat from the battery modules when the battery modules are hotter than desired and to provide heat when the battery modules are too cold to operate optimally.

Temperature variances in the thermal plates can cause variations in the performance of the battery modules. In systems comprising multiple battery packs, thermal variation between the battery packs can also degrade the performance of the system.

A need exists for improved thermal control systems and methods for battery packs.

SUMMARY

A support structure for a battery pack including battery cells is provided. The support structure comprises a base plate; a thermal plate positioned between the battery cell and the base plate; a thermal gap pad between the battery cell and the thermal plate; and a compressible support between the thermal plate and the base plate.

Advantageously, a support structure in which the thermal plates may float in a manner controlled by the compressible support and thermal pad as described below protects the thermal plates and the battery cells/modules while simultaneously providing thermal control and reducing the weight of the battery pack.

A battery pack comprising the support structure and a method of making the support structure are also provided.

BRIEF DESCRIPTION OF THE DRAWINGS

The above-mentioned embodiments and additional variations, features and advantages thereof will be further elucidated by the following illustrative and nonlimiting detailed description of embodiments disclosed herein with reference to the appended drawings, wherein.

In the drawings, corresponding reference characters indicate corresponding parts, functions, and features throughout the several views. The drawings are not necessarily to scale and certain features may be exaggerated in order to better illustrate and explain the disclosed embodiments.

DETAILED DESCRIPTION

Figure 1:
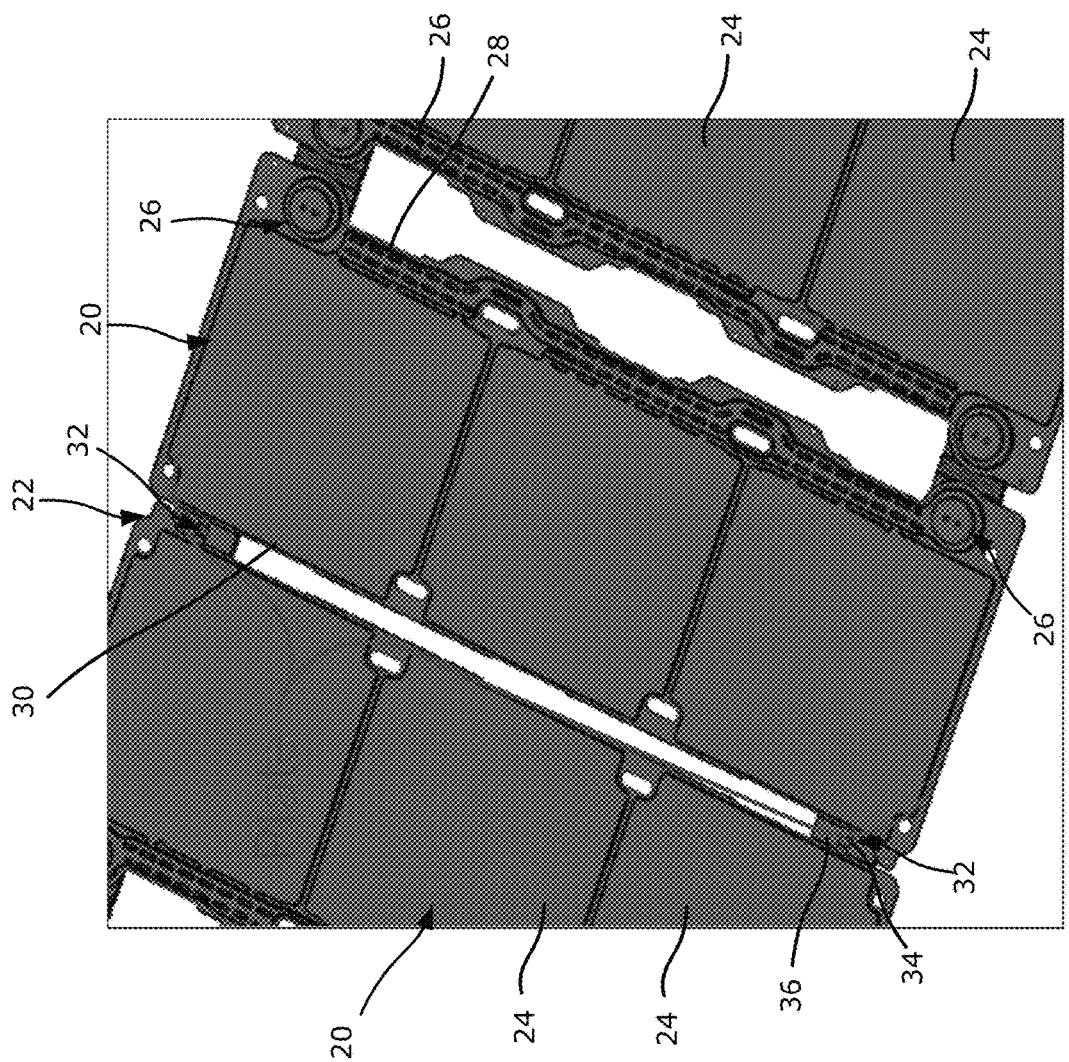
FIG. 1 is a partial perspective view of an embodiment of a thermal plate assembly including a thermal plate showing multiple sub-plates.

For the purposes of promoting an understanding of the principles of the disclosure, reference will now be made to the embodiments illustrated in the drawings, which are described below. The embodiments disclosed below are not intended to be exhaustive or limit the disclosure to the precise form disclosed in the following detailed description.

Highly efficient thermal control of a battery pack results in longer life and reliability of the battery pack, predictable battery operation, and optimum performance.

In a first aspect, the disclosure provides a liquid flow regime through a thermal plate which allows for a very even thermal distribution. While typically the liquid is cycled through the thermal plate to cool the battery pack, it can also be heated to heat the battery pack.

In one embodiment, the thermal plate comprises a cross-flow structure within sub-plates coupled to a parallel flow across primary plate manifolds. This results in a 'parallel-parallel' flow. The flow across each of the plates is tuned to give a very even distribution. In one example, the temperature gradient between sub-plates is less than 4%, less than 3%, less than 2%, and even more preferably less than 1%.

The parallel-parallel flow keeps the temperature across a large surface area substantially the same and constant.

In some embodiments, the thermal plate assembly comprises a plate including a first sheet; a second sheet attached peripherally to the first sheet defining an internal volume therebetween; sheet strips between the first sheet and the second sheet dividing the internal volume into parallel forward flow channels and reverse flow channels; an inlet port; and an outlet port, each of the sheet strips sized and shaped to allow fluid discharged from a forward flow channel to flow into a reverse flow channel or fluid discharged from a reverse flow channel to flow into a forward flow channel to thereby allow fluid supplied at the inlet port to flow through the forward flow channels and the reverse flow channels and discharge out of the outlet port, wherein at least one of the inlet port or the outlet port is sized and shaped to provide a predetermined flow rate.

In some variations thereof, the thermal plate assembly further comprises a third sheet comprising the sheet strips, the third sheet being shaped to have an effective thickness greater than before shaping and contacting the first sheet and the second sheet at sections disposed between the sheet strips. The third sheet may be corrugated and the corrugations define the forward flow channels and the reverse flow channels. The apex of the corrugations may be bonded to the first and second sheets to longitudinally seal the forward flow channels and the reverse flow channels.

In some variations thereof, the thermal plate assembly further comprises a supply manifold, a return manifold, and frame supporting the plate, the supply manifold, and the return manifold, wherein the inlet port is fluidly coupled to the supply manifold and the outlet port is fluidly coupled to the return manifold. The thermal plate may comprise two or more sub-plates, each of the sub-plates including the first sheet, the second sheet attached peripherally to the first sheet defining the internal volume therebetween, and the sheet strips between the first sheet and the second sheet dividing the internal volume into parallel forward flow channels and reverse flow channels. The sub-plates may aligned in parallel with the channels and fluidly coupled thereby. Each of the two or more sub-plates may be fluidly coupled to another of the two or more sub-plates of the thermal plate. One of the two or more sub-plates is connected to the inlet port and another of the two or more sub-plates is connected to the outlet port.

In some variations thereof, the thermal plate assembly further comprises a second thermal plate supported by the frame, wherein the inlet port of the second thermal plate is fluidly coupled to the supply manifold and the outlet port of the second thermal plate is fluidly coupled to the return manifold. The thermal plates may be arranged orthogonally to the sub-plates of each thermal plate. The inlet port or the outlet port of the second thermal plate may be sized and shaped to provide the predetermined flow rate, providing balanced-flow between the thermal plate and the second thermal plate. In the present context balanced-flow indicates equal flow. However, the sizes of the sub-plates and thermal plates do not have to be equal and the balanced-flow may be selected to compensate for size differences or other differences, in which case balanced-flow may be referred as proportional flow. The thermal plate has a first side opposite a second side, and the forward flow channels and the reverse flow channels may flow from or to the first side to or from the second side.

In a second aspect, the disclosure provides a support structure for thermal plates utilizing compression and thermally conductive materials. The support structure provides support at a fraction of the mass of prior support structures, thus allowing for significant weight reduction of the battery packs. The thermal plates may be, but do not have to be, those described with reference to the first aspect of the disclosure. Generally, any thermal plate operable to remove or provide heat can be used, preferably any thermal plate sized and structured to permit fluid flow therein.

The thermal plates according with the first aspect are lighter than prior art plates, in part because the support structure of the second aspect ensures proper heat transfer while the weight of the battery cells does not rest on the thermal plates. Instead, the battery cells are supported by the base plate/frame, and the thermal plate floats upward with a predetermined force. Therefore, the thermal plates do not have to be as robust and can be lighter, which altogether results in much lighter battery packs.

The support structure comprises a compressible support, such as a layer of compressible foam. A thermal gap pad may be disposed, optionally, between battery cell and the thermal plate. Heat transfer paste or equivalent materials capable to transfer heat evenly across the surface of the thermal plate may be used instead of a thermal gap pad. The thermal gap pad may be a layer of thermally conductive foam. If the base plate of a frame supporting the battery cells has an uneven surface, or for any other reason, a substantially incompressible layer of material may be positioned between the base plate and the compressible support to ensure the compressible support applies the same pressure across its surface onto the thermal plate by insulating the effect of base plate surface variations.

In a third aspect, the disclosure provides a thermal control system and method for temperature control of multiple battery packs. The unique features of the method allow for easier integration of the thermal control system into customer applications and thus longer life of cells.

In one embodiment, the thermal control system comprises proportional valves installed in single battery packs. A control algorithm proportionally controls the valves as a function of a temperature differential between battery packs, thus flow balancing the multiple packs. The system can be employed to both evenly heat and cool each pack by reading temperature differentials across each pack.

In one variation, thermocouples in the inlet and outlet of each pack sense temperatures and a battery management system (BMS) determines which packs require more heating or cooling, then controls the valves to reduce flow to the packs least needing cooling/heating and to increase flow to the packs in need of more cooling/heating. This system allows for simpler coolant line design and aids in modular pack use when using multiple packs in an application.

Figure 2:
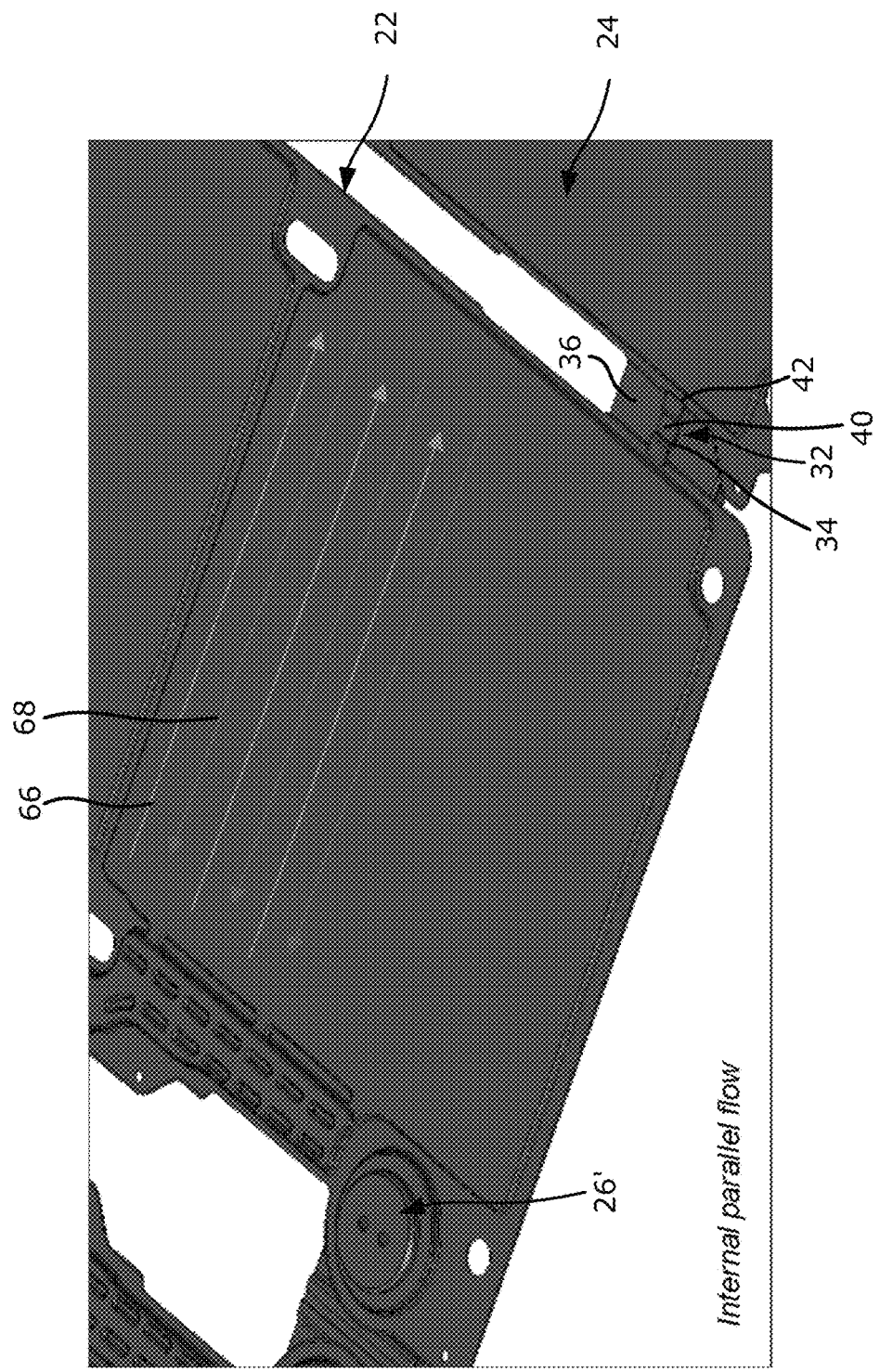
FIG. 2 is partial perspective view of a thermal plate according to FIG. 1 illustrating a cross-flow pattern in a sub-plate.
Figure 6:
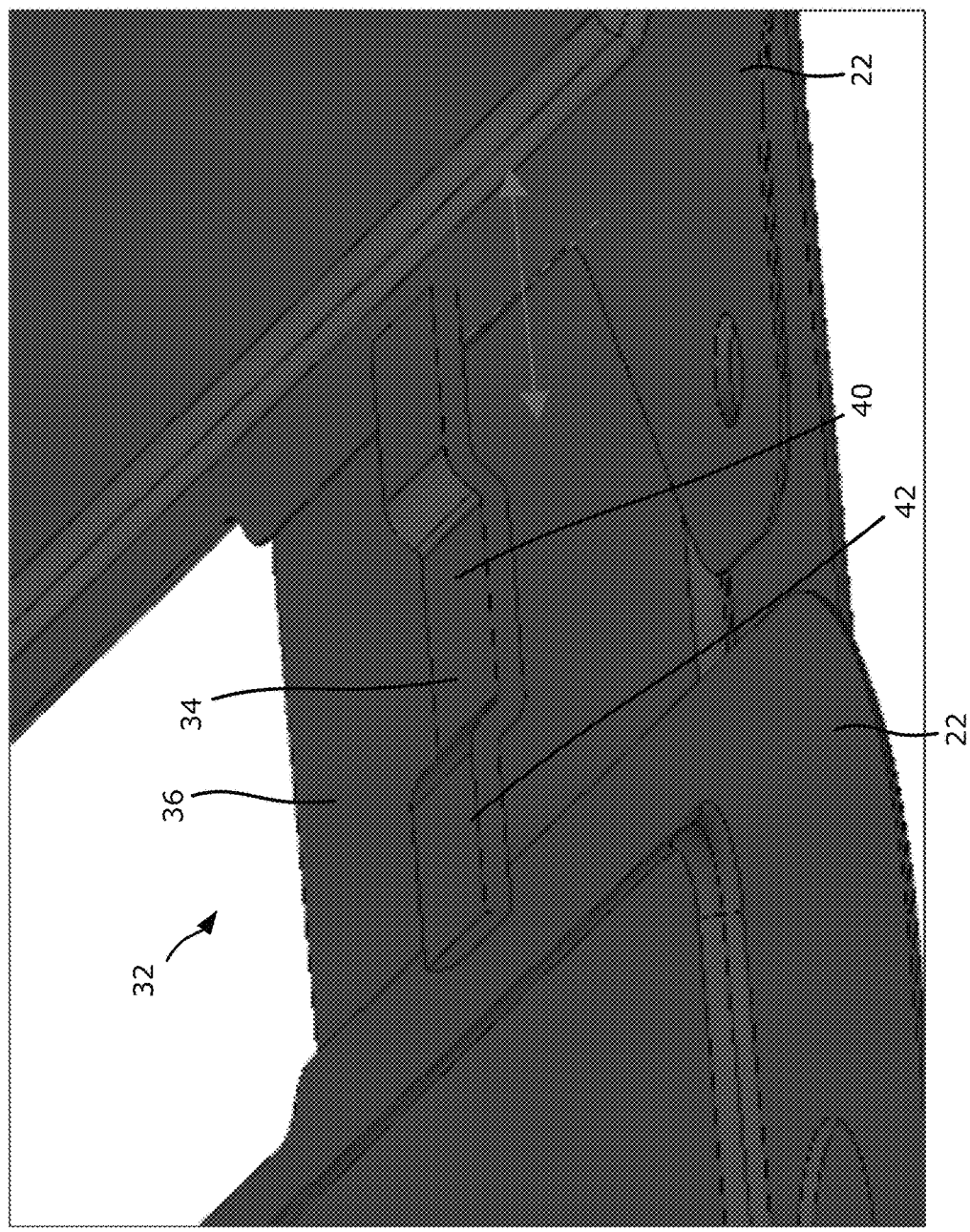
FIG. 6 is a perspective view of an embodiment of a butterfly joint joining two thermal plates.

FIGS. 1 and 2 are partial perspective views of an embodiment of a thermal plate 20 mounted on a frame 22 and including multiple sub-plates 24 fluidly coupled to flow-balanced ports 26. Opposing thermal plates 20 are affixed on a first side 28 to frame 22 and on an opposite, floating, second, side 30 are slidingly connected to frame 22 via a butterfly joint 32 configured to permit thermal expansion of thermal plates 20. Butterfly joint 32 (best seen in FIGS. 2 and 6) comprises a butterfly strip 34 affixed to a base portion 36. Butterfly strip 34 has a central portion 40 affixed to base portion 36 and wings 42 extending from central portion 40 and overlapping respective edges of frames 22. Base portion 36 may be connected to and be part of frame 22 and may also be a separate part that is supported by butterfly strip 34.

Figure 3:
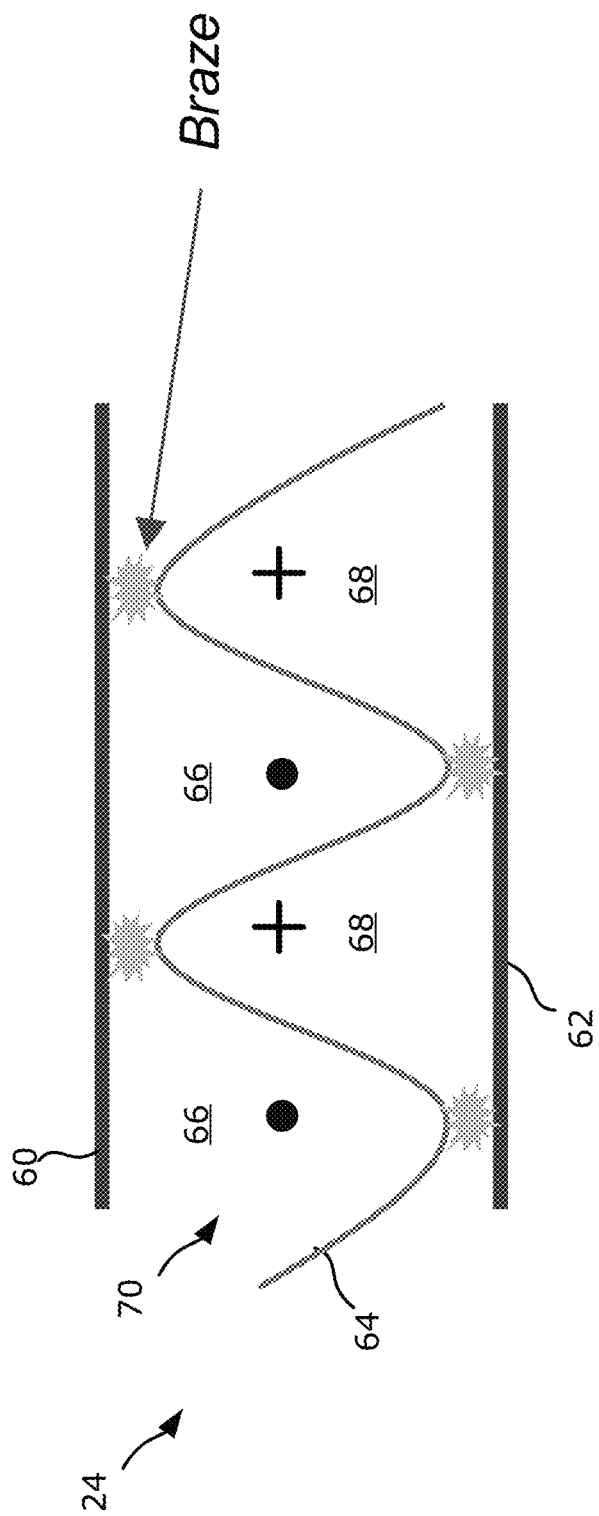
FIG. 3 is a schematic diagram of a cross-section of the sub-plate of FIGS. 1 and 2.

Referring to FIGS. 2 and 3, each sub-plate 24 comprises opposing first and second sheets 60, 62 separated by an intermediate sheet 64. In one example, depicted in FIG. 3, intermediate sheet 64 is corrugated to have a cross-sectional thickness greater than a thickness of the unshaped sheet and defines forward and return flow channels 66, 68. A cut-out (not shown) is provided on the end of intermediate sheet 64 opposite flow-balanced ports 26. Sheets 62 and 64 are attached to each other in a sealed manner to form an enclosed space 70. In use, refrigeration fluid flows from flow-balanced port 26 into forward flow channel 66, exits forward flow channel 66 in the area surrounding the cut-out and flows into return flow channel 68, and then discharges from sub-plate 24 to an adjacent sub-plate 24 or out through another flow-balanced port 26. Flow-balanced port 26 includes orifices sized and shaped for each thermal plate 20 so that in a parallel arrangement of thermal plates 20 each thermal plate 20 has the same flow of refrigerant fluid. As shown, each thermal plate 20 has three sub-plates 24, an inlet port 26' and an outlet port 26", wherein one or both of the inlet and outlet ports may be flow-balanced.

In one variation, intermediate sheet 64 comprises multiple adjacent cut-outs providing flow paths from forward to reverse to forward to reverse flow channels, such that multiple combinations of forward and reverse flow channels are arranged side-by-side and supplied from one flow-balanced port 26, as seen in FIG. 3, wherein two forward flow channels 66 (also indicated by a cross indicative of flow into the page) and two reverse flow channels 68 (also indicated by a point indicative of flow out of the page) are shown. Intermediate sheet 64 may have substantially sinusoidally shaped corrugations. The corrugations may also have other cross-sectional shapes, such as square. In another example, intermediate sheet 64 comprises strips bonded to sheets 60 and 62 along their longitudinal edges.

Figure 4:
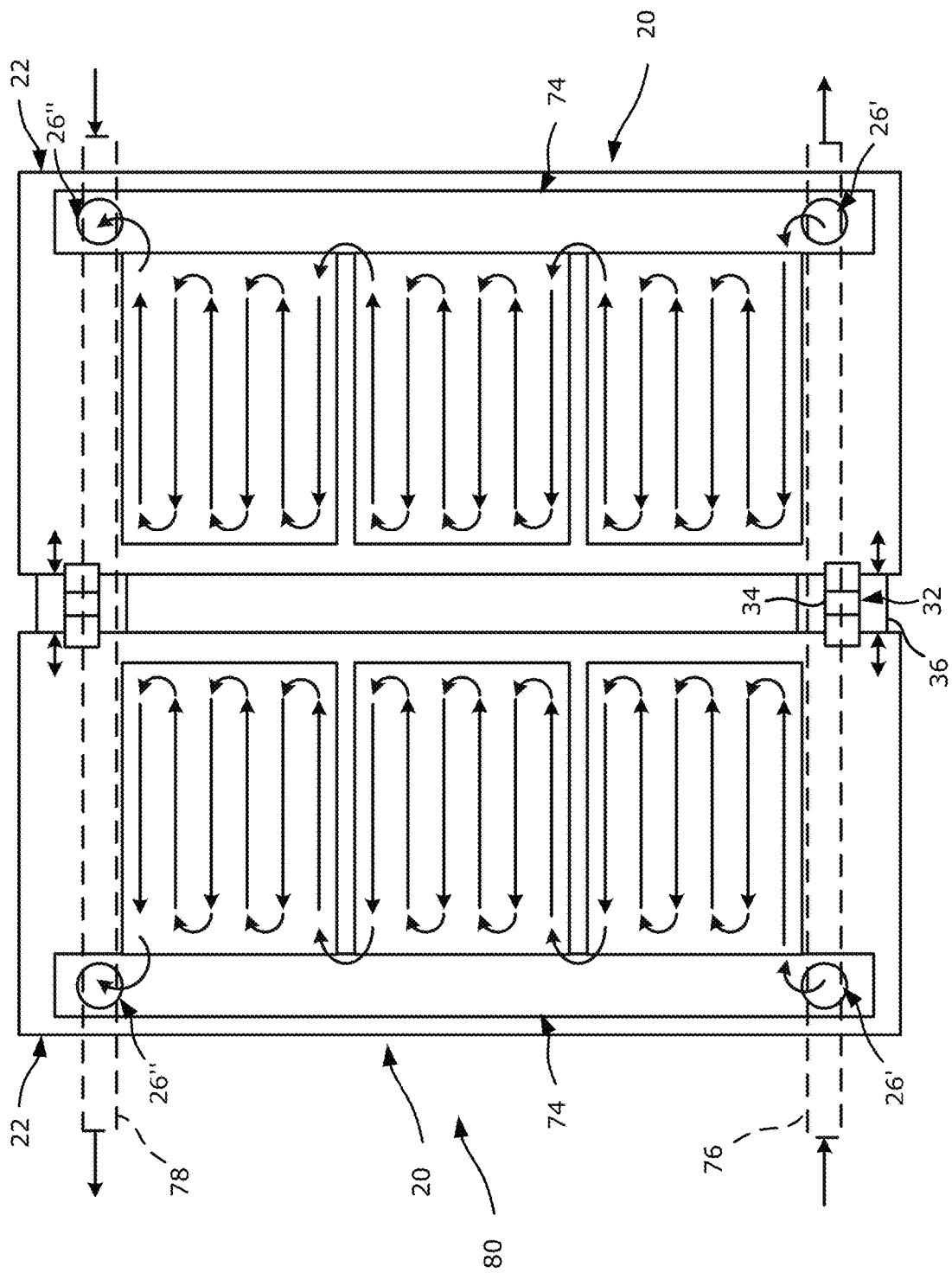
FIG. 4 is schematic diagram of a parallel-parallel flow arrangement based on the thermal plates and sub-plates of FIGS. 1 and 2.

Referring now to FIG. 4, inlet ports 26' are supplied by a supply manifold 76 and outlet ports 26" discharge to a return manifold 78. A secondary manifold 74 fluidly couples inlet ports 26' with sub-plates 24, outlet ports 26" with different sub-plates 24, and in some cases adjacent sub-plates 24. Each thermal plate 20 may have three sub-plates 24, as shown, but may have more or fewer sub-plates. Double-headed arrows adjacent butterfly joint 32 indicate thermal expansion and contraction of thermal plates 20. As shown, two thermal plates 20 are arranged with their floating sides adjacent each other and the first sides arranged away from the floating sides mirror images. Secondary manifold 74, supply manifold 76, return manifold 78, and thermal plates 20 form a thermal control assembly 80 in which thermal plates 20 are arranged with their floating sides adjacent each other and the first sides arranged away from the floating sides, in a mirror image arrangement.

Figure 5:
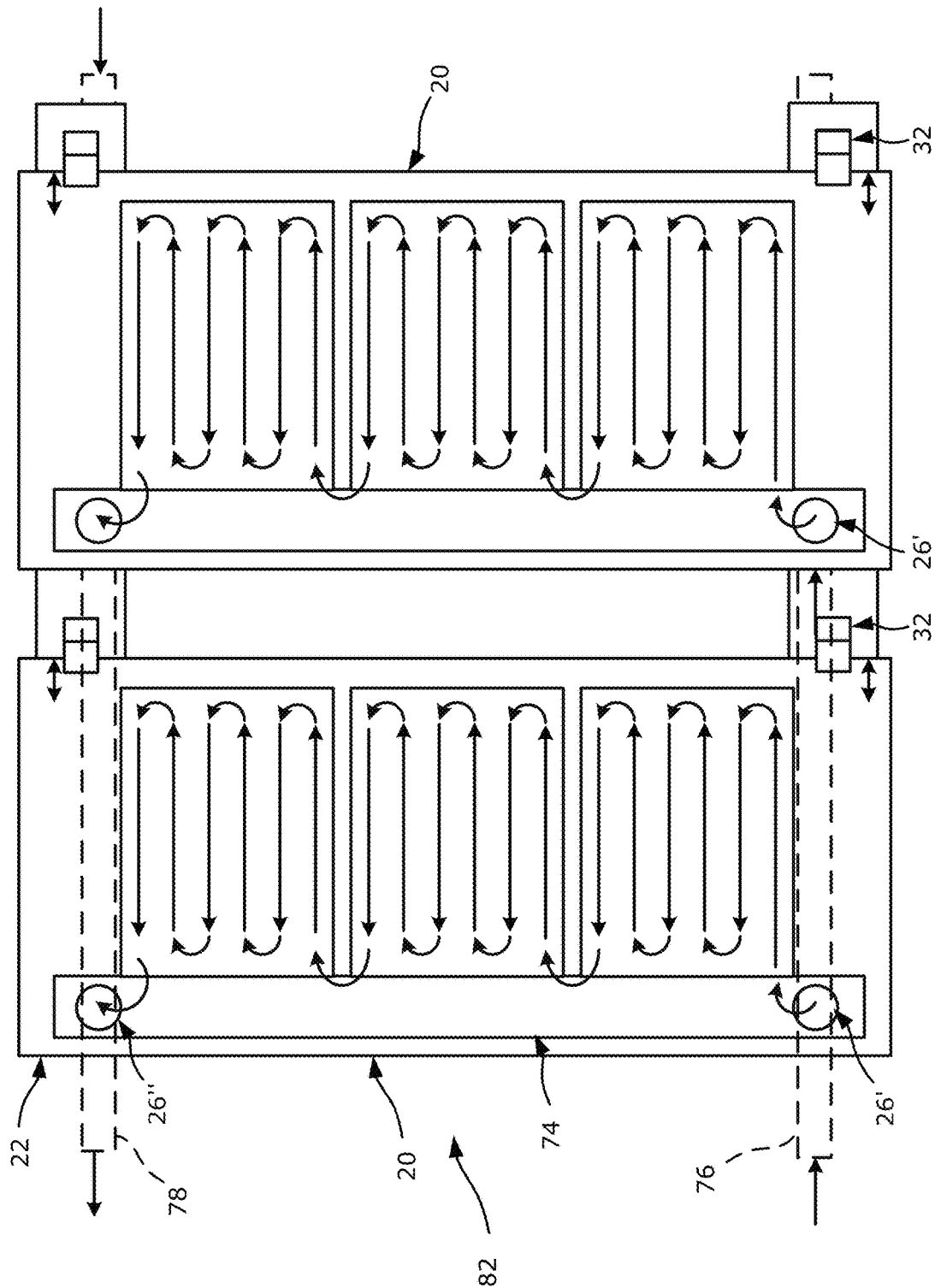
FIG. 5 is another schematic diagram of a parallel-parallel flow arrangement based on the thermal plates and sub-plates of FIGS. 1 and 2.

In a variation of the foregoing embodiment, depicted in FIG. 5, a thermal control assembly 82 is provided in which thermal plates 20 are aligned in the same orientation instead of in a mirror image arrangement.

Figure 7:
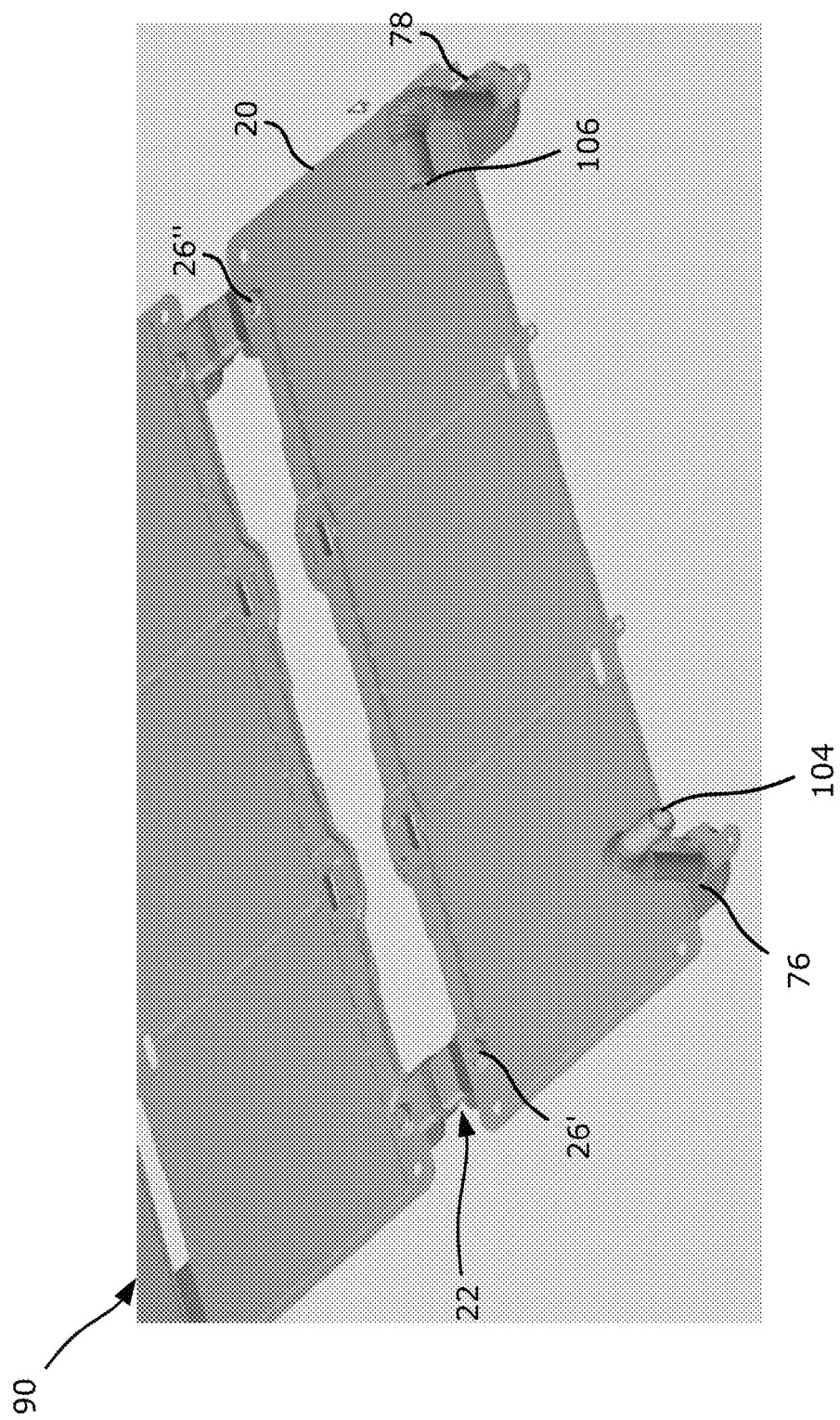
FIG. 7 is a perspective view of an embodiment of a thermal plate assembly including inlet and outlet manifolds.
Figure 8:
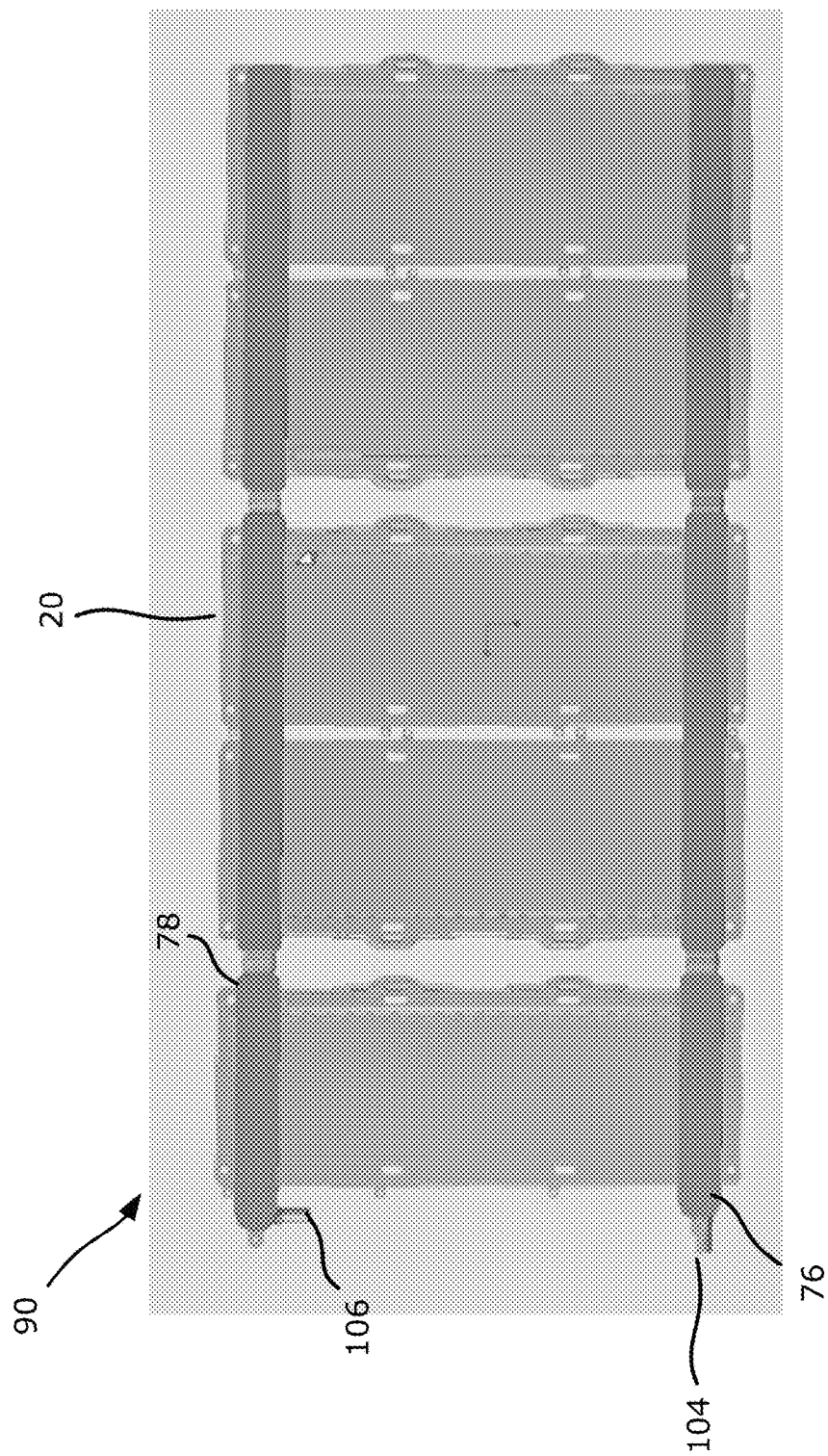
FIG. 8 is a plan view of the embodiment of the thermal plate assembly of FIG. 7.

FIGS. 7 and 8 depict embodiments of a thermal plate assembly 90 including two thermal plates mounted on a frame and including inlet and outlet manifolds 76, 78 and optional supply and discharge lines 106, 108, discussed further below. The thermal plate includes a self-contained manifold between the inlet and discharge manifolds that provide and remove fluid from the assembly. The self-contained manifold extends between the inlet and outlet ports and provides fluid flow between adjacent sub-plates. Openings from the self-contained manifold to provide fluid to each of the sub-plates vary in cross-section or number or both proportionally to the distance from the inlet port, so that as the distance increases the openings increase in cross-section or number or both to increase flow and thus compensate for the reduced pressure, resulting in balanced or equal flow to and from each sub-plate.

As described above, in some embodiments a thermal plate assembly for a battery module comprises a plate including: a first sheet; a second sheet attached peripherally to the first sheet defining an internal volume therebetween; sheet strips between the first sheet and the second sheet dividing the internal volume into parallel forward flow channels and reverse flow channels; an inlet port; and an outlet port, each of the sheet strips sized and shaped to allow fluid discharged from a forward flow channel to flow into a reverse flow channel or fluid discharged from a reverse flow channel to flow into a forward flow channel to thereby allow fluid supplied at the inlet port to flow through the forward flow channels and the reverse flow channels and discharge out of the outlet port, wherein at least one of the inlet port or the outlet port is sized and shaped to provide a predetermined flow rate.

In some variations thereof, the thermal plate assembly comprises a third sheet comprising the sheet strips, the third sheet being shaped to have an effective thickness greater than before shaping and contacting the first sheet and the second sheet at sections disposed between the sheet strips. The third sheet may be corrugated and the corrugations may define the forward flow channels and the reverse flow channels.

In some variations thereof, the thermal plate assembly comprises a supply manifold, a return manifold, and frame supporting the plate, the supply manifold, and the return manifold, wherein the inlet port is fluidly coupled to the supply manifold and the outlet port is fluidly coupled to the return manifold. The thermal plate may comprise two or more sub-plates, each of the sub-plates including the first sheet, the second sheet attached peripherally to the first sheet defining the internal volume therebetween, and the sheet strips between the first sheet and the second sheet dividing the internal volume into parallel forward flow channels and reverse flow channels. Each of the two or more sub-plates may be fluidly coupled to another of the two or more sub-plates of the thermal plate. One of the two or more sub-plates may be connected to the inlet port and another of the two or more sub-plates may be connected to the outlet port.

In some variations thereof, the thermal plate assembly comprises a second thermal plate supported by the frame, wherein the inlet port of the second thermal plate is fluidly coupled to the supply manifold and the outlet port of the second thermal plate is fluidly coupled to the return manifold. The inlet port or the outlet port of the second thermal plate is sized and shaped to provide the predetermined flow rate, providing balanced-flow between the thermal plate and the second thermal plate.

In some variations thereof, the thermal plate has a first side opposite a second side, and the forward flow channels and the reverse flow channels flow from or to the first side to or from the second side. The thermal plate may be affixed to the frame in a floating manner on the first side and in a non-floating manner on the second side, to permit thermal expansion between the first side and the second side. A butterfly joint slidingly attaches the first side to the frame.

Figure 9:
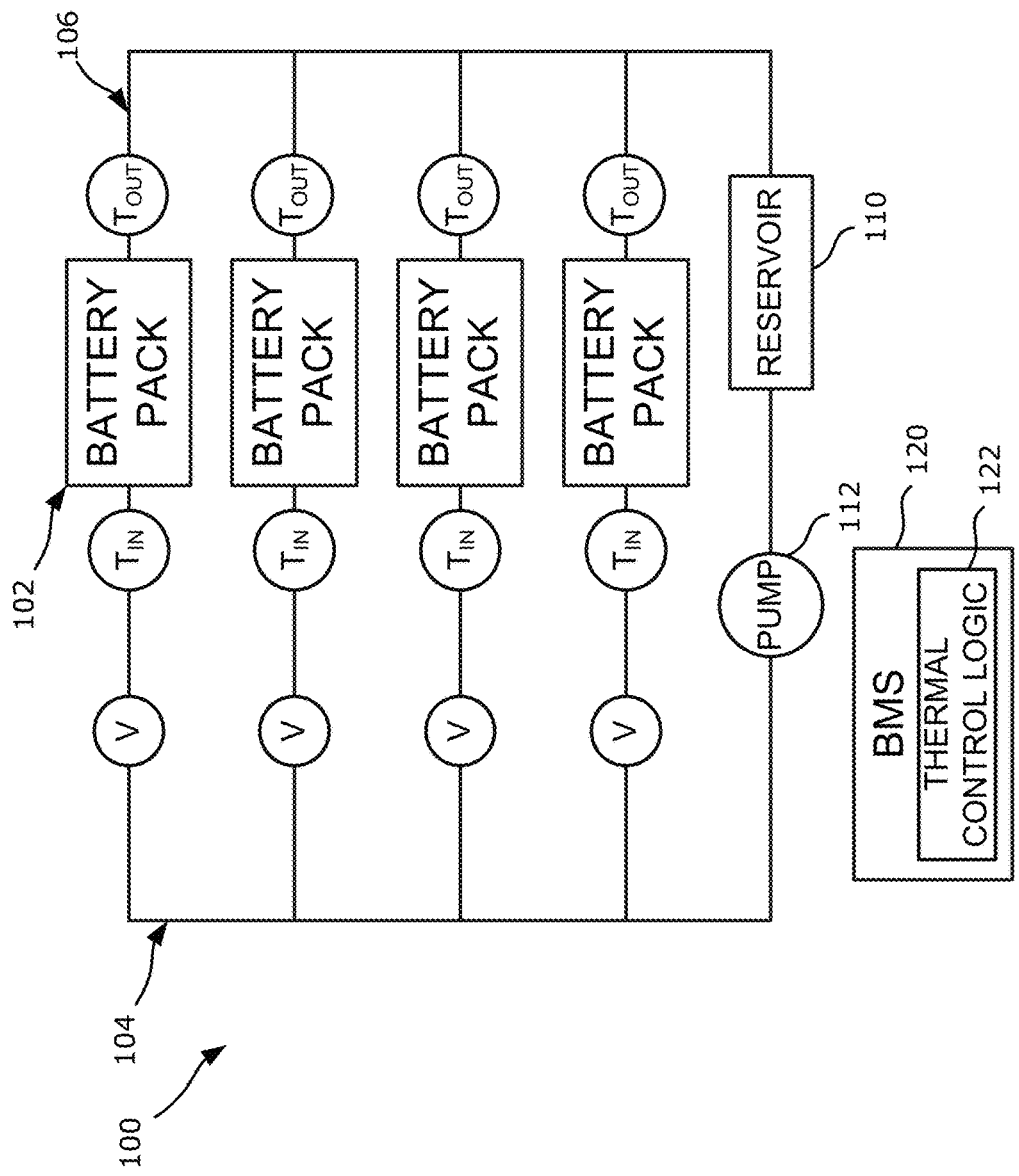
FIG. 9 is a diagram of an embodiment of a thermal control circuit including proportional flow control of multiple battery packs.

FIG. 9 is a diagram of an embodiment of temperature control circuit 100 including proportional flow control of multiple battery packs 102, each fluidly connected between a supply line 104 and a return line 106. A temperature sensor $T_{IN}$ is coupled to sense the temperature of refrigerant liquid flowing in supply line 104 and a temperature sensor $T_{OUT}$ is coupled to sense the temperature of refrigerant liquid being discharged by battery pack 102. Each battery pack 102 comprises a plurality of battery modules arranged with major surfaces arranged in parallel and edges resting on thermal control plates 20. Thermal control plates 20 are fluidly coupled between supply line 104 and a return line 106.

A proportional valve V is shown in supply line 104. Proportional valve V is controlled by thermal control logic 122 of BMS 120 to control the flow of refrigerant liquid flowing through thermal control plates 20 of a battery pack 102 based on the temperatures sensed by sensors $T_{IN}$ and $T_{OUT}$. A reservoir 110 contains refrigerant liquid and a pump 112 pumps the refrigerant liquid through supply lines 104. Thus, one pump 112 generates fluid pressure and proportional valves V distribute the available liquid to balance the temperatures of battery packs 102.

Figure 10:
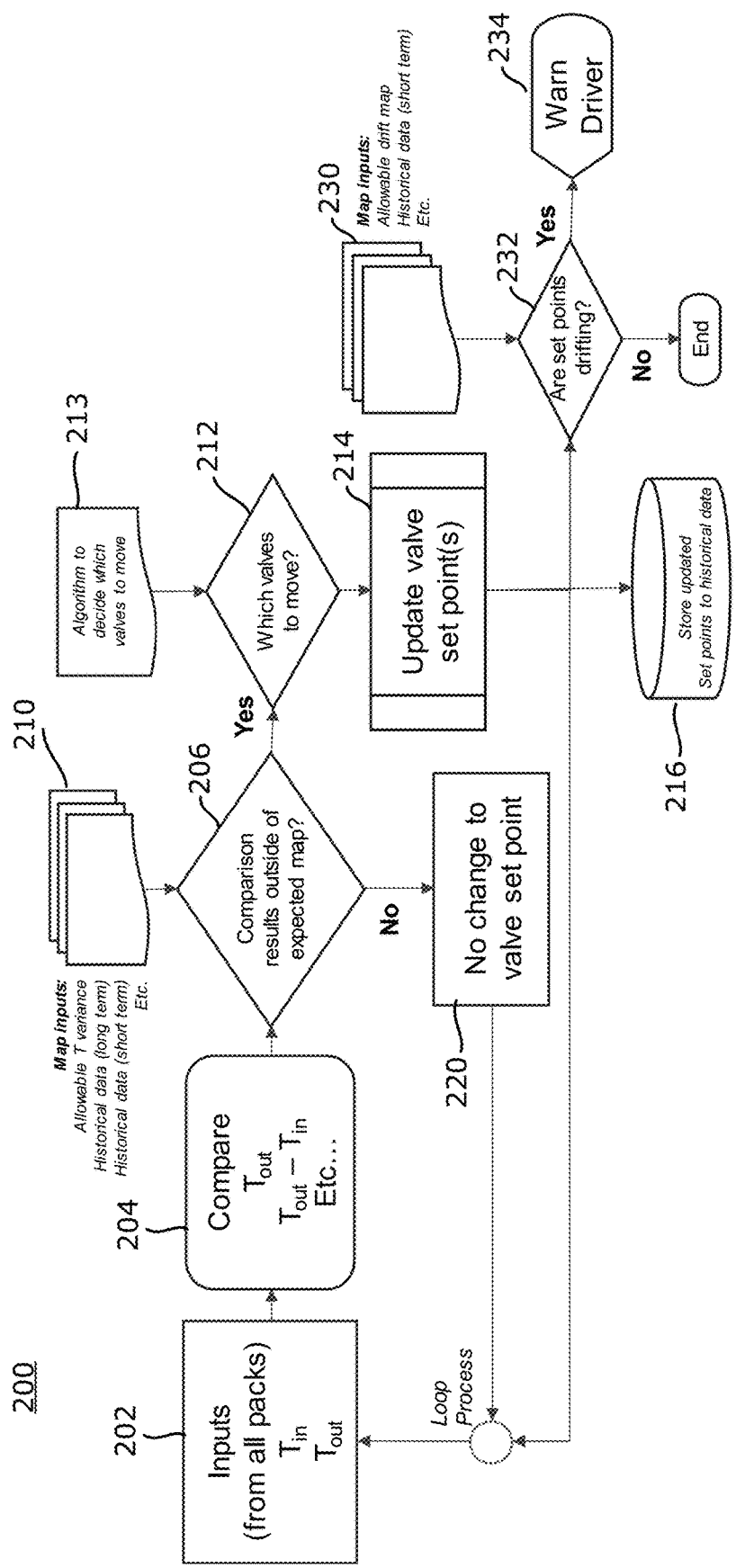
FIG. 10 is a flowchart of an embodiment of a method to provide proportional flow control in the circuit of FIG. 9.

FIG. 10 is a flowchart 200 of an embodiment of a method to provide proportional flow control in circuit 100 of FIG. 9. The method may be performed by a processor in BMS 120 executing thermal control logic 122. The term "logic" as used in this disclosure includes software and/or firmware executing on one or more programmable processing devices, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. Logic may comprise processing instructions embedded in non-transitory machine readable media.

Returning to FIG. 10, the method begins by determining the temperatures of the battery packs by reading, at 202, the temperatures obtained via temperature sensors $T_{IN}$ and $T_{OUT}$. At 204 the method determines the difference between the in/out temperatures of each batter pack. At 206 the method compares the temperature differences from each battery pack to allowable temperature variances and historical data, short and long term, stored in a map 210, to identify when the temperature differences are outside the historical data map bounds.

If a temperature difference is out of bounds, at 212 the method determines that the valve associated with the respective temperature sensors $T_{IN}$ and $T_{OUT}$ should be moved to bring the temperature difference in bound, and at 214 updates a database 216 of setpoints. An algorithm 213 included in thermal control logic 122 which determines which of the valves to adjust, based on, for example, temperature differences of each battery pack, e.g. reducing the largest temperature difference first by increasing flow to that battery pack. BMS 120 then sends control signals to the valves to maintain the desired setpoints.

If the temperature difference is not out of bounds, at 220 the method determines that the valve setpoints do not need adjustment and the method returns to 202.

Optionally, at 232 the method may compare the setpoints to a drift map 230 indicative of allowable setpoint drift over time and determine based on the comparison whether the changes in the setpoints are within expected ranges or are indicative of drift. If indicative of drift, the method generates a drift warning, at 234.

Figure 11:
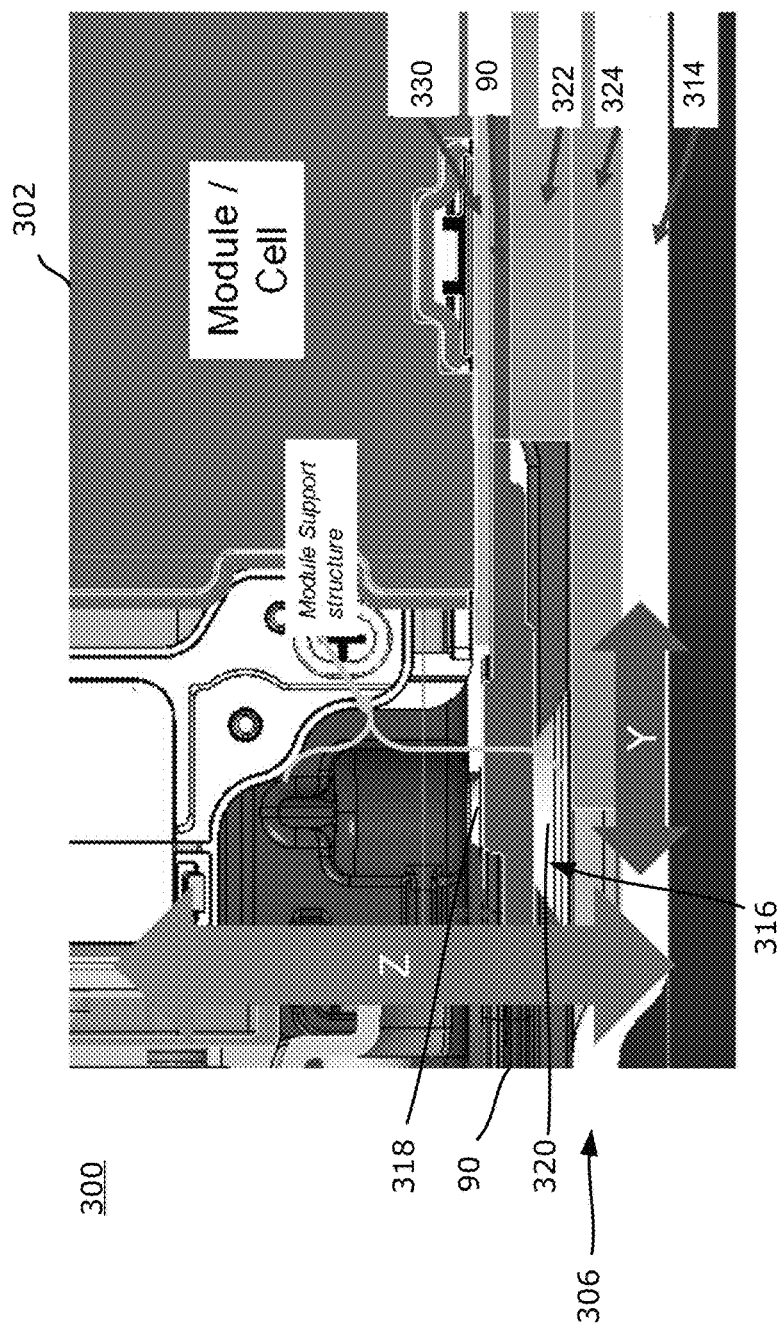
FIG. 11 is a perspective view of an embodiment of a thermal plate assembly adjacent a battery module.

FIG. 11 is a perspective view of an embodiment of thermal plate assembly 90 adjacent a battery module 302 of a battery pack 300. In turn, a thermal plate assembly support structure 306 supports the thermal plate assembly. Thermal plate assembly support structure 306 includes a base plate 314, which may be part of a frame supporting battery module 302, an alignment member 316 having a pin 318 extending from a base 320, a first support layer 322 that is compressible, e.g. foam, and a second support layer 324, e.g. foam. The second support layer may provide a planar surface for the thermal plate assembly and may be substantially incompressible or at least less compressible than the first support layer. The support layers can be combined in an appropriately shaped multi-layer structure. Other elastically compressible materials may be used instead of foam. The thermal plate assembly is pressed to the battery modules or cells with a predetermined force and, optionally, with a thermal gap pad 330 therebetween to ensure good thermal conductivity. Thermal gap pad 330 may comprise thermally conductive foam. The force is predetermined by selection of first compressible support layer 322, which may comprise one or more layers on the opposite side of the thermal plate assembly. The thermal gap pad permits efficient heat transfer through its thickness and increases surface contact with the battery module and the thermal plate assembly by filling the gaps that may exist between them, similar as when using heat-sink paste between a heat sink and an integrated circuit. Thermal plate assembly support structure 306 supports the thermal plate assembly. Pins 318 pass through openings in the thermal plate assembly allowing it to float between the thermal plate and the compressible support layer keeping the thermal plate assembly pressed against the battery module (with the thermal gap pad or another thermally conductive "filler" therebetween). The battery module may have heat transfer fins extending toward the heat transfer assembly. The module support structure provides fixed compression limits through support points. Bases 316 may define such compression limits although other compression stops may be provided for that purpose, for example as protrusions or spacers extending from the base plate.

Figure 12:
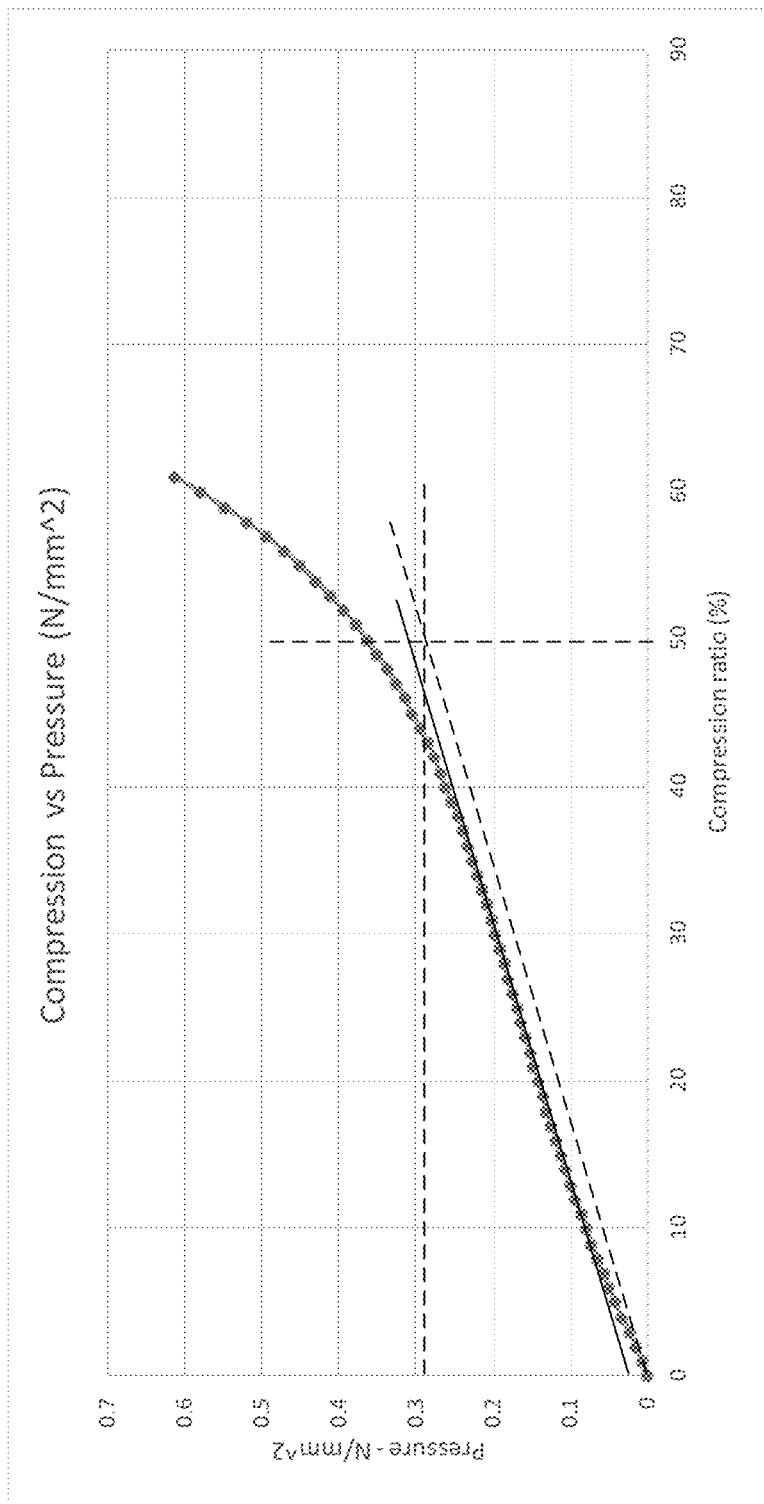
FIGS. 12 and 13 are graphs depicting example compression curves of support pad materials.
Figure 13:
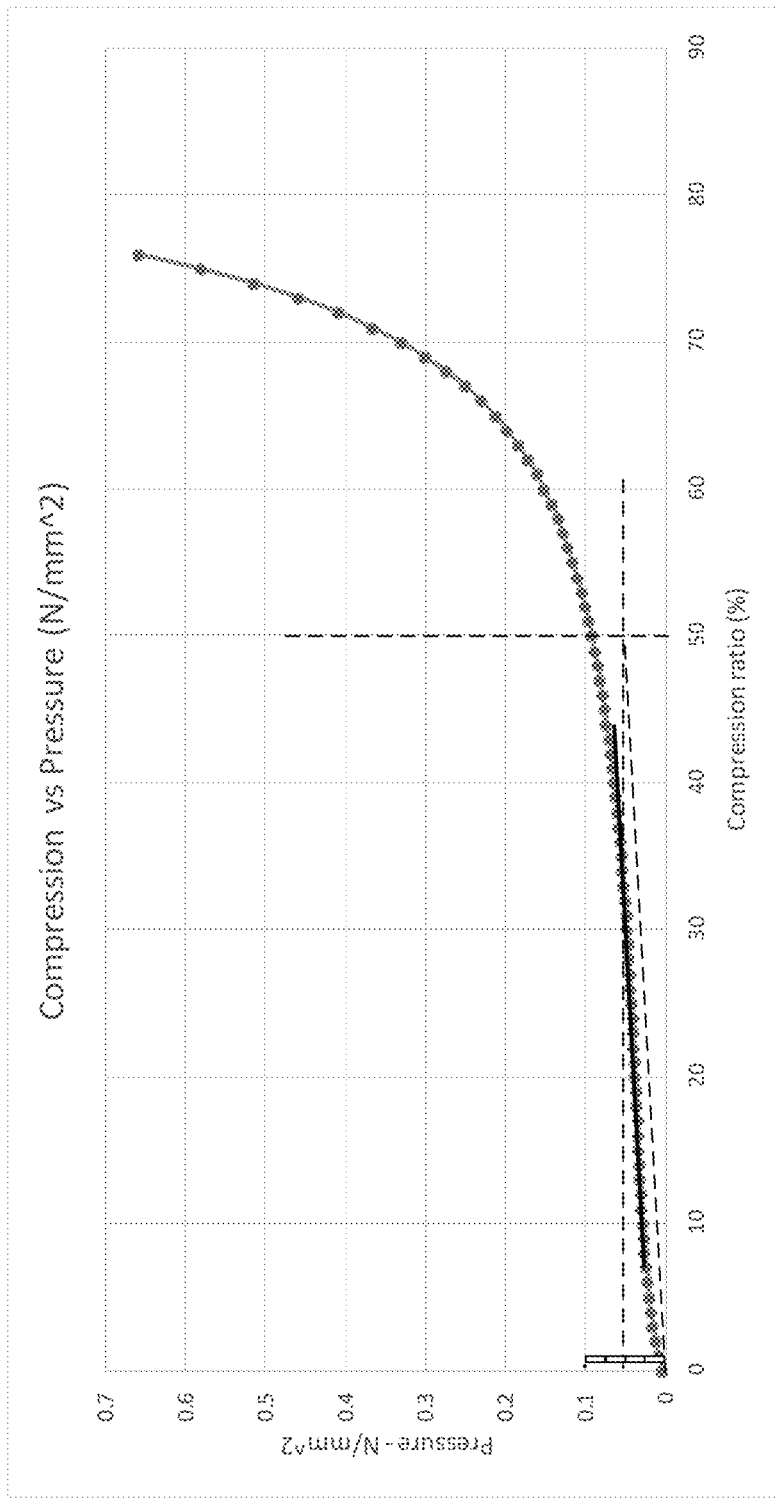

FIGS. 12 and 13 are graphs depicting example compression curves of support pad materials. In some embodiments, a support structure for a battery pack including battery cells is provided, the support structure comprising: a base plate; a thermal plate positioned between the battery cell and the base plate; a thermal gap pad between the battery cell and the thermal plate; and a compressible support between the cooling plate and the base plate. The thermal gap pad may comprise a compressible material, e.g. thermally conductive foam. The thermal plate has a major surface defining an X-Y direction and a thickness expanding in a Z-direction. An alignment member comprises a base and a pin extending from the base, the pin extending longitudinally in the Z-direction, wherein the thermal plate comprises an aperture and the pin passes through the aperture with a gap therebetween allowing the thermal plate to float in the Z-direction. In one example, the compressible support is configured to support the thermal plate with a constant force. In another example, the compressible support comprises a first layer and a second layer disposed between the first layer and the base plate. The compressible support may be structured to compress 40% with a pressure less than 0.300 $N/mm^2$, and preferably to compress 30% with a pressure less than 0.220, and more preferably to compress 40% with a pressure less than 0.100 $N/mm^2$ and 30% with a pressure less than 0.080 $N/mm^2$.

The compressible support may be structured to compress 40% with a pressure less than 0.080 $N/mm^2$ and to compress 30% with a pressure less than 0.060 $N/mm^2$.

As shown in FIG. 12, the compressible support may be structured to compress with a substantially straight line profile from 10% to 40% compression, the substantially straight line having a slope of at most 0.0070 $N/mm^2/\%$ compression. In FIG. 12, compression is about 0.2700 $N/mm^2$ at 40% compression and 0.200 $N/mm^2$ at 30% compression, and the slope of a straight line passing through the origin is about 0.0058 $N/mm^2/\%$ compression. The example material is a silicone foam named Bisco™ HT-840 manufactured by Rogers Corporation. By substantially straight it is meant that the curve may deviate slightly, no more than 20%, from a straight line, between compressions of 10%-40%. A compression of 40% denotes that the material compressed from an uncompressed state, where its thickness was 100%, to a compressed state caused by the pressure, of 40% of its uncompressed state. The dashed lines are provided to facilitate determination of the slope. A straight line is shown, substantially passing through datapoints at compression ratios between 10-40%.

In FIG. 13, compression is about 0.065 N/mm² at 40% compression and 0.0480 N/mm² at 30% compression, and the slope of a straight line passing through the origin is about 0.0011 N/mm²/% compression. The example material is a silicone foam named Bisco™ HT-870 manufactured by Rogers Corporation. Different materials and blends thereof may be chosen to achieve a slope from 10% to 40% compression of at most 0.0070 N/mm2/% compression, preferably less than 0.0030 N/mm2/% compression, and even more preferably below 0.0015 N/mm2/% compression.

The scope of the disclosure is to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A battery pack including:
   battery cells and a support structure, the support structure comprising:
   a base plate;
   a thermal plate positioned between the battery cells and the base plate, the thermal plate receiving a flow of fluid that adjusts a temperature of the battery cells;
   a thermally conductive material, comprising a thermal gap pad, between the battery cell and the thermal plate; and
   a compressible support, comprising compressible foam, between the thermal plate and the base plate and configured to support the thermal plate and the thermal gap pad against the battery cells with a constant force.

2. The battery pack of claim 1, wherein the compressible support comprises a first layer and a second layer disposed between the first layer and the base plate and wherein the first layer is compressible and a second layer compresses less than 10% with a pressure of 0.300 N/mm².

3. The battery pack of claim 1, wherein the compressible support is structured to compress 40% with a pressure less than 0.300 N/mm².

4. The battery pack of claim 3, wherein the compressible support is structured to compress 30% with a pressure less than 0.220.

5. The battery pack of claim 3, wherein the compressible support is structured to compress 40% with a pressure less than 0.080 N/mm² and to compress 30% with a pressure less than 0.060 N/mm².

6. The battery pack of claim 3, wherein the compressible support is structured to compress with a substantially straight line profile from 10% to 40% compression, the substantially straight line having a slope of at most 0.0070 N/mm²/% compression.

7. The battery pack of claim 6, wherein the substantially straight line has a slope of at most 0.0030 N/mm²/% compression.

8. The battery pack of claim 7, wherein the substantially straight line has a slope of at most 0.0015 N/mm²/% compression.

9. A battery pack system comprising:
   a battery pack as in claim 1, the battery pack further comprising a proportional valve operable to throttle the fluid through the thermal plate to cool the battery pack, an inlet temperature sensor, and an outlet temperature sensor; and
   a battery management system (BMS) including a processor executing thermal control logic operable to determine a temperature differential between temperatures sensed by the inlet temperature sensor and the outlet temperature sensor and to control the proportional valve and thereby reduce the temperature differential.

10. The battery pack system of claim 9, wherein:
    the battery pack is a first battery pack; and
    the battery pack system further comprises a second battery pack, wherein the thermal control logic is operable to control first the proportional valve of the first battery pack or a proportional valve of the second battery pack, which has a greater temperature differential.

11. The battery pack system of claim 10, wherein:
    the thermal plate of the first battery pack and the thermal plate of the second battery pack comprise respective forward flow channels and reverse flow channels for the fluid, the forward flow channels and the reverse flow channels being arranged in parallel to each other;
    the battery pack system further comprises a supply manifold and a return manifold for the fluid; and
    the thermal plate of the first battery pack and the thermal plate of the second battery pack are arranged to receive the fluid in parallel between the supply manifold and the return manifold.

12. The battery pack system of claim 11, wherein:
    the battery pack system further comprises a secondary manifold arranged in parallel with the thermal plate of the first battery pack;
    the thermal plate of the first battery pack comprises two or more sub-plates; and
    the two or more sub-plates comprise respective forward flow channels that receive fluid from the secondary manifold and respective reverse flow channels that return fluid to the secondary manifold.

13. The battery pack system of claim 10, wherein:
    the thermal plate of the first battery pack and the thermal plate of the second battery pack comprise respective flow channels for the fluid, the flow channels being arranged in a serpentine pattern within each thermal plate;
    the battery pack system further comprises a supply manifold and a return manifold for the fluid; and
    the thermal plate of the first battery pack and the thermal plate of the second battery pack are arranged to receive the fluid in parallel between the supply manifold and the return manifold.

14. The battery pack system of claim 13, wherein:
the battery pack system further comprises a secondary manifold arranged in parallel with the thermal plates of the first and second battery packs;
the thermal plate of the first battery pack comprises two or more sub-plates; and
the two or more sub-plates comprise respective forward flow channels that receive fluid from the secondary manifold and respective reverse flow channels that return fluid to the secondary manifold, the forward flow channels and the reverse flow channels being arranged in parallel to each other to provide the serpentine pattern.

15. A method of making a battery pack, comprising:
providing a base plate;
providing a cooling plate;
positioning a compressible support, comprising compressible foam, between the cooling plate and the base plate;
positioning a thermal gap pad on the cooling plate; and
positioning a battery cell in contact with the thermal gap pad, the battery pack supported by the base plate and pressed against the thermal gap pad with a predetermined force provided by the compressible support and the thermal gap pad, the cooling plate receiving a flow of fluid that adjusts a temperature of the battery cell.

16. The method of claim 15, wherein the thermal gap pad is comprised of a compressible material which is compressible by pressure provided by the compressible support.

17. The method of claim 15, wherein the compressible support comprises a first layer and a second layer disposed between the first layer and the base plate.

18. The method of claim 17, wherein the first layer is compressible and a second layer is substantially incompressible.

19. The method of claim 15, wherein the compressible support is structured to compress 40% with a pressure less than 0.300 N/mm$^2$.

20. The method of claim 19, wherein the compressible support is structured to compress 30% with a pressure less than 0.220.

21. The method of claim 19, wherein the compressible support is structured to compress 40% with a pressure less than 0.100 and to compress 30% with a pressure less than 0.080 N/mm$^2$.

22. The method of claim 19, wherein the compressible support is structured to compress with a substantially straight line profile from 10% to 40% compression, the substantially straight line having a slope of at most 0.0070 N/mm$^2$/% compression.

23. The method of claim 22, wherein the substantially straight line has a slope of at most 0.0030 N/mm$^2$/% compression.

* * * * *